(12) United States Patent
Kang et al.

(10) Patent No.: US 8,055,281 B2
(45) Date of Patent: Nov. 8, 2011

(54) METHOD AND APPARATUS FOR TRANSMITTING AND RECEIVING A PAGING MESSAGE IN A FREQUENCY OVERLAY COMMUNICATION SYSTEM

(75) Inventors: Hyunjeong Kang, Seoul (KR); Jaehyuk Jang, Daegu (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 6 days.

(21) Appl. No.: 12/621,342

(22) Filed: Nov. 18, 2009

(65) Prior Publication Data

US 2011/0065461 A1    Mar. 17, 2011

Related U.S. Application Data

(60) Provisional application No. 61/243,350, filed on Sep. 17, 2009.

(51) Int. Cl.
*H04W 4/00* (2009.01)
(52) U.S. Cl. .......................... 455/458; 370/329; 370/349
(58) Field of Classification Search .................. 370/329, 370/349; 455/458
See application file for complete search history.

(56) References Cited

U.S. PATENT DOCUMENTS

| 2003/0074382 A1* | 4/2003 | Schmandt et al. ............. 708/491 |
| 2006/0291414 A1* | 12/2006 | Lim et al. ....................... 370/329 |
| 2008/0233961 A1* | 9/2008 | Cho et al. ....................... 455/436 |

FOREIGN PATENT DOCUMENTS

| EP | 1 874 070 A1 | 1/2008 |
| KR | 10-2007-0030001 A | 3/2007 |
| WO | 97/32440 A1 | 9/1997 |
| WO | 2006/094253 A1 | 9/2006 |

OTHER PUBLICATIONS

Wu X et al: "A Low-Cost, Low-Delay Location Update/Paging Scheme in Hierarchical Cellular Networks", Mobide 2003. Proceedings 3rd. ACM International Workshop on Data Engineering for Wireless and Mobile Access. San Diego, CA, Sep. 19, 2003; [International Workshop on Data Engineering for Wireless and Mobile Access. (Mobide)], New York, NY: ACM, US, Sep. 19, 2003, pp. 46-50, XP001217404, DOI: DOI: 10.1145/940923.940932 ISBN:.

* cited by examiner

*Primary Examiner* — Pierre-Louis Desir
(74) *Attorney, Agent, or Firm* — Jefferson IP Law, LLP (57) ABSTRACT

An apparatus and method for transmitting/receiving a paging message in a frequency overlay communication system are provided. The method includes determining if information is to be transmitted to a Mobile Station (MS) that is in an idle state, determining a sub frequency band for allocation to the MS, and transmitting a paging message to the MS using the determined sub frequency band.

22 Claims, 8 Drawing Sheets

METHOD AND APPARATUS FOR TRANSMITTING AND RECEIVING A PAGING MESSAGE IN A FREQUENCY OVERLAY COMMUNICATION SYSTEM

CROSS-REFERENCE TO RELATED APPLICATIONS

This application claims the benefit under 35 U.S.C. §119 (e) of U.S. Provisional Application No. 61/243,350, filed Sep. 17, 2009.

BACKGROUND OF THE INVENTION

1. Field of the Invention

The present invention relates to a communication system using a frequency overlay scheme. More particularly, the present invention relates to an apparatus and method for transmitting/receiving a paging message in a frequency overlay communication system.

2. Description of the Related Art

As communication systems are evolving, the services they provide are expanding and diversifying. For example, while previous communication systems provided only voice communication between users, current communication systems provide additional services such as video communication, digital broadcasting, Internet communication, and the like. To support these advanced features and services, additional bandwidth is necessary to provide the additional information. Accordingly, research and development in the field of broadband communication is very active.

To support broadband communication, at least two issues must be considered. First, frequency resources for any communication system are limited. That is, only a limited number of frequencies are available for a given system. Accordingly, as communication technology is developed, demand for the use of a frequency band increases, especially for frequency bands supporting broadband service. Thus, a license cost for the frequency band use increases. Second, compatibility with existing systems must be considered. That is, a new broadband communication system must be implemented with consideration of user equipment that was designed for an older system. Because both the limited frequency resources and the backward compatibility with previously installed communication systems must be considered, design of a broadband communication system can be difficult. Moreover, due to the increase in the license cost for the frequency band and the difficulty in backward compatibility, various schemes that are proposed to provide a broadband service may be delayed and potentially not implemented at all.

To address the consequences of the limited frequency bands, that is, to address the problem of the increased license costs and to smoothly provide the new broadband services without interruption to existing services, various schemes have been proposed. In one such scheme, a frequency overlay system is proposed. A frequency overlay system is a system in which some or all frequency bands of an advanced broadband communication system are overlapped with some or all frequency bands of legacy communication system. That is, both the new broadband communication system and the existing legacy communication system use at least one common frequency band. For example, a Code Division Multiple Access 2000 3x (CDMA2000 3x) communication system, an overlay Orthogonal Frequency Division Multiplexing (OFDM) communication system, etc. may be considered. In such a case, a Mobile Station (MS) designed for use in the broadband communication system and an MS designed for use in the legacy communication system can either exist together in the legacy communication system or can exist together in the broadband communication system.

In a frequency overlay system, a Base Station (BS) providing service to an MS periodically transmits a paging message to the MS. The paging message is used to instruct the MS, which is in an idle state, to update its position information or initialize service with the BS. Thus, the MS in the idle state periodically wakes up, receives the paging message, and performs the received instruction. More specifically, if a BS detects that traffic exists which needs to be sent to the MS, the BS sends a paging message to the MS indicating that traffic exists for the MS. Periodically, the MS wakes up to detect whether the paging message exists and, if it does exist, receives the paging message.

In a frequency overlay system, when a legacy MS connects to an advanced BS, the legacy MS may utilize any frequency band of the advanced BS. In such a situation, if the BS detects that traffic exists which needs to be sent to the MS, the advanced BS sends a paging message to the MS through all frequency bands used by the advanced BS. In this case, by sending the paging message over all frequency bands used by the advanced BS, the frequency bands are inefficiently used since the MS needs to receive the paging message on only a single frequency band. Because the frequency bands of an advanced system have high costs, their inefficient use causes great concern.

To address the frequency band inefficiency problem, the advanced BS can allocate a specific frequency band for sending paging messages. However, when a plurality of paging messages for different MSs are sent through the specific frequency band, it causes a problem of collision among the paging messages.

Accordingly, there is a need for an apparatus and method for efficiently transmitting a paging message to an MS of a broadband communication system and an MS of a legacy communication system by a BS of a broadband communication system forming a communication channel with each MS.

SUMMARY OF INVENTION

An aspect of the present invention is to address at least the above-mentioned problems and/or disadvantages and to provide at least the advantages described below. Accordingly, an aspect of the present invention is to provide for the transmitting/receiving of a paging message in a frequency overlay communication system promoting the efficiency of a frequency resource.

Another aspect of the present invention is to provide an apparatus and method for transmitting/receiving a paging message, for, if a new service starts for a Mobile Station (MS) that is in an idle state, updating position information on the MS in a frequency overlay communication system.

Yet another aspect of the present invention is to provide an apparatus and method for effectively transmitting paging messages of an MS of a Narrow Band (NB) communication system and an MS of an Extended Band (EB) communication system in a frequency overlay communication system.

A further aspect of the present invention is to provide an apparatus and method for selectively sending paging information on an MS of an NB communication system and an MS of an EB communication system, to a Frequency Allocation Block (FAB) of a Base Station (BS) in a frequency overlay communication system.

Still another aspect of the present invention is to provide an apparatus and method for dispersing and transmitting a paging message of an MS of an EB communication system to the whole FAB in a frequency overlay communication system.

Another aspect of the present invention is to provide an apparatus and method for preventing repeated transmission of a paging message in a frequency overlay communication system.

The above aspects are addressed by providing an apparatus and method for transmitting/receiving a paging message in a frequency overlay communication system.

In accordance with an aspect of the present invention, a method for transmitting/receiving a paging message by a Base Station (BS) in a frequency overlay communication system is provided. The method includes determining if information is to be transmitted to a Mobile Station (MS) that is in an idle state, determining a sub frequency band for allocation to the MS, and transmitting a paging message to the MS using the determined sub frequency band.

In accordance with another aspect of the present invention, a method for transmitting a paging message by an MS in a frequency overlay communication system is provided. The method includes identifying a paging listening interval in which to receive a paging message in an idle state, determining a sub frequency band on which to receive the paging message, and receiving the paging message on the determined sub frequency band.

In accordance with yet another aspect of the present invention, an apparatus for transmitting/receiving a paging message by a BS in a frequency overlay communication system is provided. The apparatus includes a paging message generator for determining if information is to be transmitted to a Mobile Station (MS) that is in an idle state, a frequency determiner for determining a sub frequency band for allocation to the MS, and a paging channel generator for transmitting a paging message to the MS using the determined sub frequency band.

In accordance with still another aspect of the present invention, an apparatus for transmitting a paging message by an MS in a frequency overlay communication system is provided. The apparatus includes a frequency determiner for determining a sub frequency band on which to receive a paging message, and a paging channel restorer for identifying a paging listening interval in which to receive the paging message in an idle state and for receiving the paging message on the determined sub frequency band.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Prior to describing the present invention, terms are defined below for convenience in understanding exemplary embodiments of the present invention. In the following description, a Narrow Band (NB) communication system denotes a non-frequency overlay communication system. For example, a legacy communication system that is already installed before a frequency overlay communication system is installed is typically a NB communication system. An Extended Band (EB) communication system denotes a frequency overlay communication system. Generally, the non-frequency overlay communication system is deemed a narrow band communication system because a frequency band used in that system is narrower than a frequency band used in the frequency overlay communication system.

A Narrow Band-Mobile Station (NB-MS) denotes a Mobile Station (MS) using an NB in the NB communication system. Similarly, an Extended Band-Mobile Station (EB-MS) denotes an MS using an EB, including the NB, in the EB communication system. A Narrow Band-Base Station (NB-BS) denotes a BS providing a service using the NB, and an Extended Band-Base Station (EB-BS) denotes a BS providing a service using an EB including the NB. It is to be understood that the above definitions use the relative terms "narrow" and "extended." For example, if an EB-MS, using a frequency band greater than its own available frequency band, exists in a coverage area serviced by an EB-BS providing the frequency band greater than the frequency band available to the EB-MS, the EB-MS would be considered an NB-MS from the viewpoint of the EB-BS.

Exemplary embodiments of the present invention relate to an apparatus and method for transmitting/receiving a paging message in a communication system using a frequency overlay scheme (hereinafter, referred to as a 'frequency overlay communication system'). That is, exemplary embodiments of the present invention relate to an apparatus and method for transmitting/receiving a paging message for NB-MSs or EB-MSs in the NB communication system and EB communication system. Here, the paging message represents a message for instructing an MS, which is in an idle state, to perform a process of updating its position information or initializing service with a BS. Thus, as an MS periodically wakes up and receives the paging message from the BS through a Down-Link (DL), the MS performs an instruction based on the received paging message.

An exemplary embodiment of the present invention includes a system and method in which a BS can effectively transmit a paging message in the frequency overlay communication system. Using the paging message according to an exemplary embodiment of the present invention, the BS can save resources otherwise used to transmit the paging message and can therefore allocate the saved resources to MSs for data transfer or other uses.

Exemplary operations and constructions of the present invention are described below with reference to the accompanying drawings. First, a related frequency allocation structure in a frequency overlay communication system to which the present invention is applied is described below with reference to FIG. 1.

Figure 1:
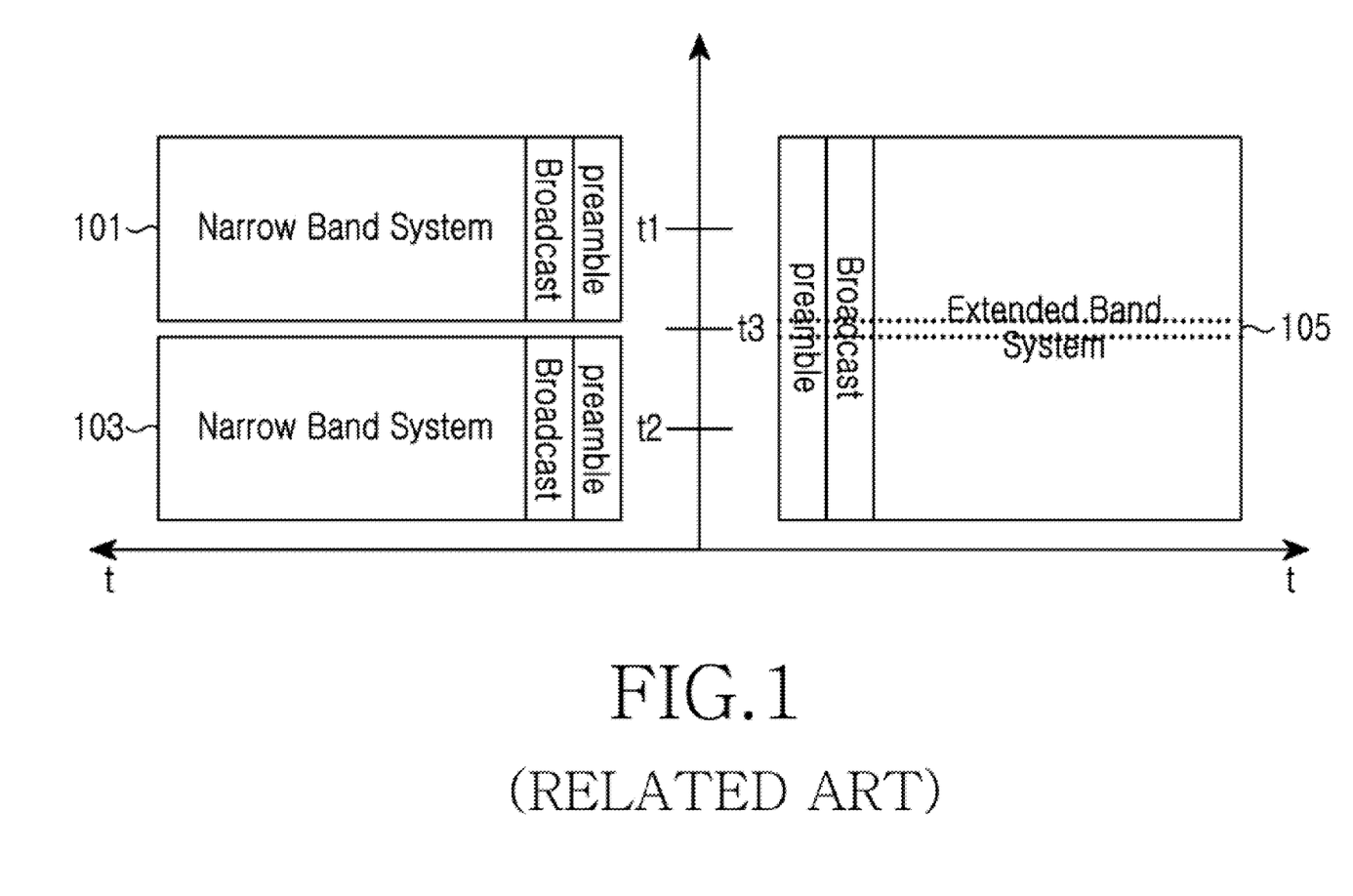
FIG. 1 is a diagram schematically illustrating a related frequency allocation structure in a frequency overlay communication system.

Referring to FIG. 1, a wireless communication system includes a first NB communication system 101 and a second NB communication system 103. The first NB communication system 101 and the second NB communication system 103 have center frequencies (f1) and (f2), respectively. The first and second NB communication systems 101 and 103 can encounter circumstances in which a frequency bandwidth is increased due to a diversification of services and/or an increase of a required transmission capacity. Thus, a communication system having an extended frequency bandwidth, i.e., EB communication system 105 can be considered. As illustrated in FIG. 1, the EB communication system 105 can be designed as having a frequency band that overlaps the frequency band of both the first NB communication system 101 and the second NB communication system 103. Alternatively, the EB communication system 105 may be designed having a frequency that overlaps only one of the first NB communication system 101 and the second NB communication system 103. For purposes of explanation, the EB communication system 105 of FIG. 1 is illustrated as overlying both the first NB communication system 101 and the second NB communication system 103 and has a center frequency (f3) lying between center frequencies (f1) and (f2) of the first NB communication system 101 and the second NB communication system 103, respectively.

As illustrated in FIG. 1, the frequency bandwidth of the first NB communication system 101 and the frequency bandwidth of the second NB communication system 103 are relatively narrow compared to the frequency bandwidth used in the EB communication system 105. However, this is merely for ease of explanation and not intended to limit the application of the present invention. That is, it is not intended to limit the frequency bandwidth used in either the first NB communication system 101 or the second NB communication system 103 to the illustrated narrow band.

The EB communication system 105 includes a sub-carrier that is used by the wireless communication system and has a bandwidth that includes a Frequency Allocation Block (FAB) of the wireless communication system. That is, the wireless communication system has, for example, a sub-carrier indicated by the center frequency (f1), which is included in the EB communication system 105. Furthermore, the wireless communication system has a specific bandwidth or FAB. Thus, the EB communication system has a bandwidth including the FAB.

Here, the FAB represents a minimum frequency band that can be allocated to an MS or BS. That is, Frequency Allocation (FA) is a frequency band that can be allocated to an MS or BS, and includes one or more FABs. For example, assuming that the BS has a frequency band of 80 MHz, the 80 MHz frequency band can be divided into eight FABs that are 10 MHz frequency bands each. Here, the 80 MHz frequency band becomes the FA. In another example, if the 80 MHz frequency band is divided by a unit of a 40 MHz frequency band, the 80 MHz frequency band includes two FABs, each having a 40 MHz frequency band. Also, the 40 MHz frequency bands each may be divided into FA1 and FA2, and the FA1 and FA2 each can be either divided into two 20 MHz frequency band FABs or can be divided into four 10 MHz frequency band FABs. At this time, if the BS uses only a 10 MHz frequency band, which is the minimum use frequency band, the 10 MHz frequency band is equal to the FAB and simultaneously is equal to the FA. Accordingly, the relationship between the FA and the FAB can be different depending upon the situation. Also, the above relationship between the FA and FAB is equally applicable to the MS.

In the following description, for purpose of convenience only and not by way of limitation, it is assumed that an FAB has a 10 MHz magnitude and that there may be a total of eight FABs in a system (i.e., an 80 MHz FA). It is also assumed that there may be systems having FAs of 10 MHz, 20 MHz, and 80 MHz. Also, the EB communication system can have a sub-carrier different from that of the NB communication systems. However, in the case of having a form in which an FAB of an NB-BS of an odd number is overlaid with a frequency band of an EB-BS, the EB communication system can have the same sub-carrier as the NB-BS. That is, in the above case, the EB communication system can have the same sub-carrier as the NB communication systems.

There are two primary reasons for considering overlying frequency systems as described above. First, by using overlying frequency systems, a license cost for a frequency band decreases. As discussed above, the license cost involved with an extension of a bandwidth greatly increases due to the limited frequency resources. The license cost can be so extensive that it is a substantial burden to the service provider. In the case of not using a frequency overlay scheme and deploying a frequency band different from a frequency band used in an existing NB communication system, the license cost involved is substantially the same as a case of using a new frequency band in a new NB communication system. Conversely, in the case of using the frequency overlay scheme, only a license cost for an additional bandwidth is involved and, because a service provider bears only the additionally involved license cost, the license cost for the increased frequency is less of a burden.

Second, the efficiency regarding the use of a frequency resource in an overlying frequency band is increased. As one example, FIG. 1 illustrates that two NB-BSs and one EB-BS with overlaid frequencies. As illustrated in FIG. 1, in the case of applying a frequency overlay scheme, efficiency of a frequency resource increases at the overlaid frequency band. One important factor in determining the performance of a general communication system is frequency efficiency. The frequency efficiency is an important factor to a service provider. This is because the service provider earns profits from the subscribers in proportion to the use efficiency of the frequency resources. That is, because the frequency overlay environment shares and uses an NB band and an EB band, the number of users supported by the same frequency band increases and accordingly, greatly increases the frequency efficiency.

However, unlike a conventional case that only an NB-BS and an NB-MS exist, the EB-BS and EB-MS can exist together with an NB communication system, as is typical in a legacy system. This case is described with reference to FIG. 2 below.

Figure 2:
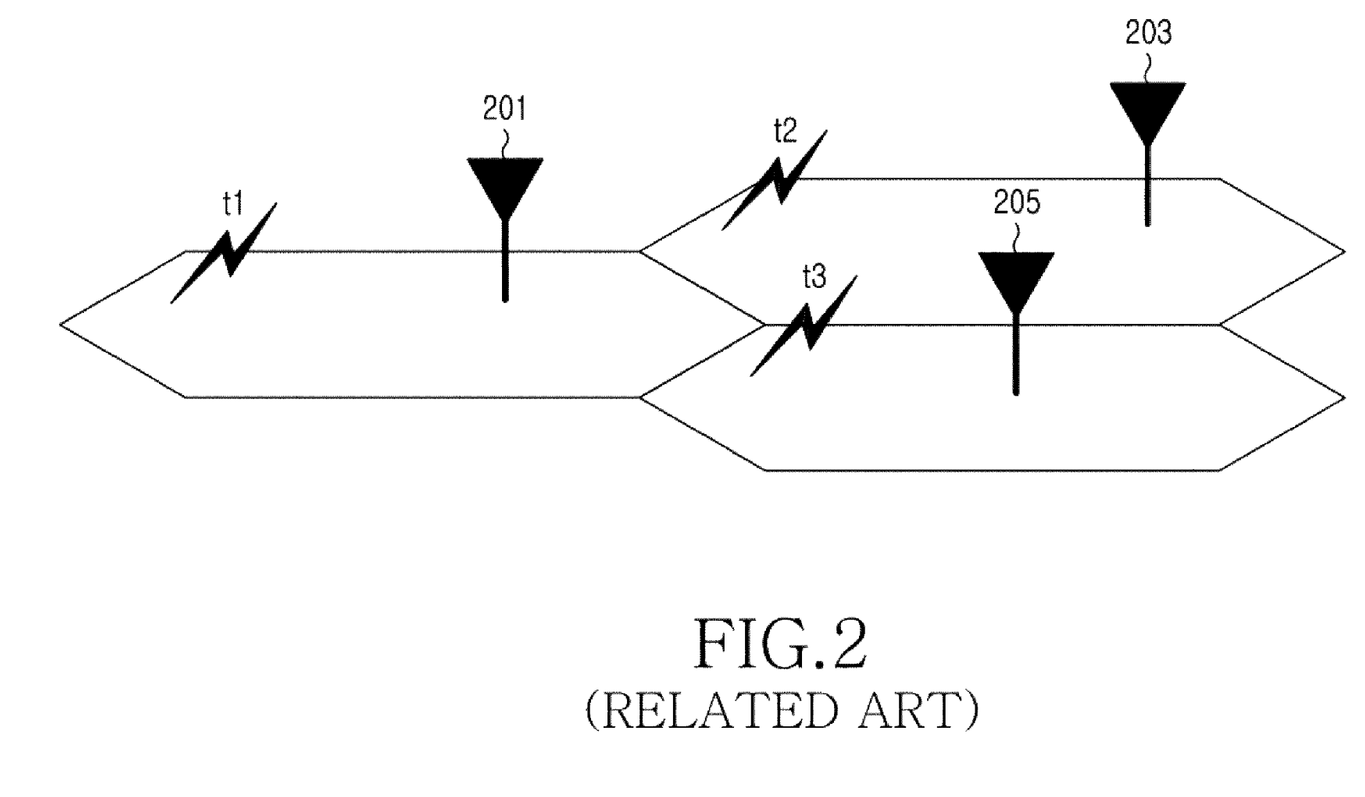
FIG. 2 is a diagram schematically illustrating a cell structure of a related frequency overlay communication system.

FIG. 2 is a diagram schematically illustrating a cell structure of a related frequency overlay communication system.

Referring to FIG. 2, the cell structure includes an NB communication system 201 having a center frequency (f1), an NB communication system 203 having a center frequency (f2), and an EB communication system 205 having a center frequency (f3). That is, FIG. 2 illustrates a case in which the NB communication systems and the EB communication system coexist as described above with reference to FIG. 1. Accordingly, not only NB communication system subscribers (i.e., NB-MSs) but also EB communication system subscribers (i.e., EB-MSs) share an overlying frequency band which results in an increased number of subscribers at the overlying frequency band. That is, there is an effect of increasing an efficiency of the frequency resource.

However, unlike a conventional case in which only an NB-BS and an NB-MS exist, when the EB communication system 205 is formed together with the NB communication system 201 and the NB communication system 203 as illustrated in FIG. 2, the NB-MSs of the NB communication systems 201 and 203 can access not only the NB-BS but also the EB-BS of the EB communication system 205. In this case, there can be a problem in that, because the NB communication systems 201 and 203 and the EB communication system 205 have different frequency bands, several control messages for performing communication between an MS and a BS must be used.

More particularly, in the case of a paging message for the NB-MS, a repetition problem may occur. The paging message is used to instruct an MS, which is in an idle state, to update its position information or initialize service with a BS. Thus, the MS in the idle state periodically wakes up, receives the paging message from a DownLink (DL), and performs the received instruction. At this time, because the NB-MS of the NB communication system is accessible to any band of the EB-BS of the EB communication system, there is a problem in that, when transmitting a paging message, the EB-BS must repeatedly transmit the paging message over the entire FA. In other words, as several bandwidths used by the EB-BS of the EB communication system exist, a paging message broadcast to the NB-MS is repeatedly transmitted in every bandwidth.

One method to address the above problem is to transmit the paging messages only on a specific FAB. However, transmitting all the paging messages on the specific FAB may lead to collision among the paging messages. Thus, there is also a need for an algorithm for dispersing and transmitting the paging message.

Accordingly, an exemplary embodiment of the present invention below proposes a paging message transmission/reception scheme for an NB-MS or an EB-MS being in an idle state in a frequency overlay communication system. That is, the present invention proposes an apparatus and method for transmitting/receiving a paging message, for, upon a start of a new service for MSs being in idle states, updating position information of the MS.

Also, an exemplary embodiment of the present invention proposes an algorithm for efficiently transmitting paging messages of MSs (e.g., NB-MSs or EB-MSs). That is, an exemplary embodiment of the present invention proposes a system and method for not sending paging information for the MSs on all FABs of a BS but selectively sending the paging message, thereby enhancing efficiency in a frequency overlay communication system.

Furthermore, an exemplary embodiment of the present invention proposes a system and method for dispersing and transmitting, over the entire FAB, a paging message transmitted to several MSs because it does not matter if the paging message is designated to a specific FAB for the EB-MS in a frequency overlaid circumstance.

Exemplary embodiments for efficiently transmitting/receiving a paging message depending on a magnitude of an FA of a BS in a frequency overlay system are described below with reference to the accompanying drawings.

Figure 3:
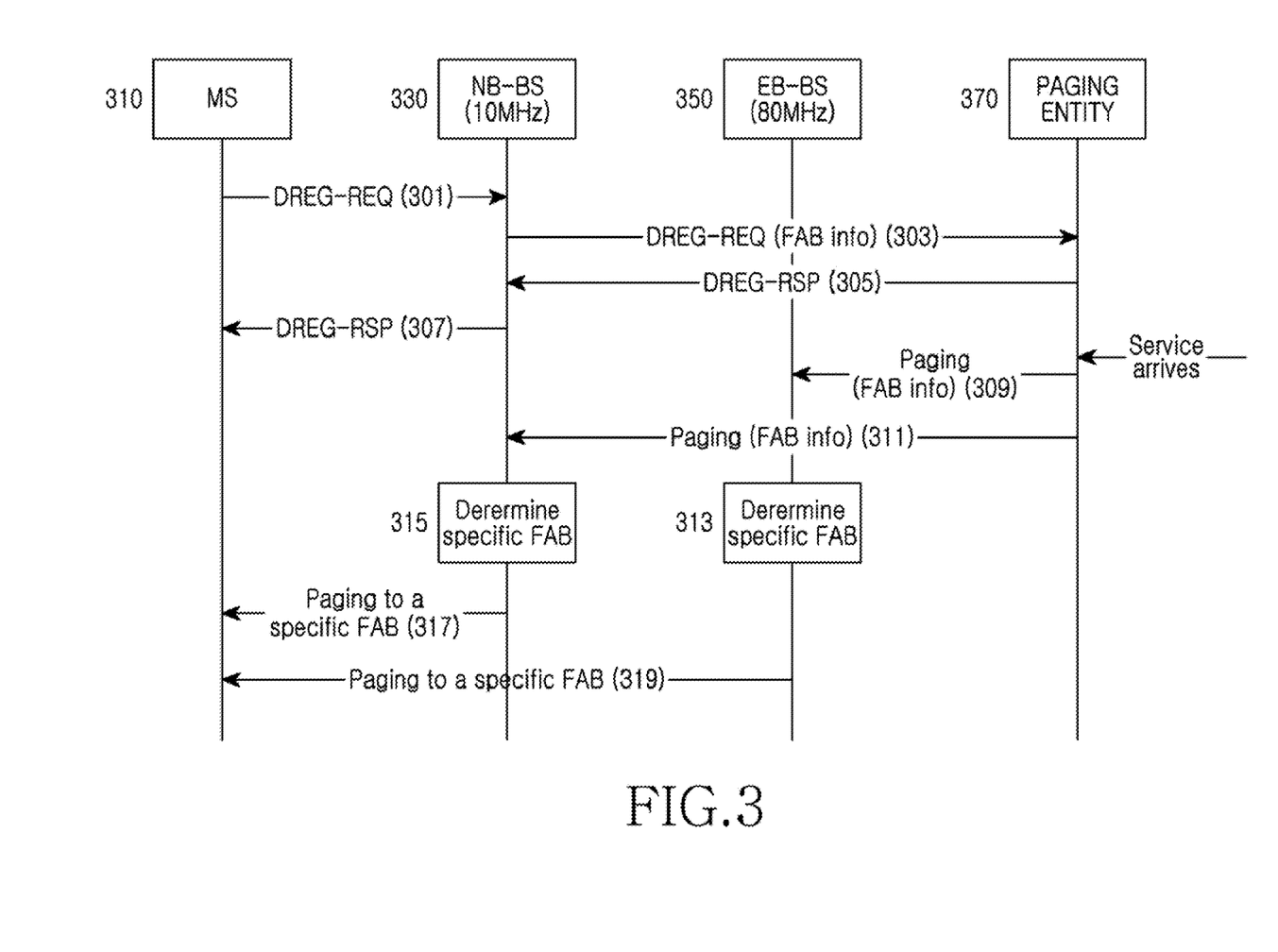
FIG. 3 is a ladder diagram schematically illustrating a process of transmitting/receiving a paging message in a frequency overlay communication system according to an exemplary embodiment of the present invention.

FIG. 3 is a ladder diagram schematically illustrating a process of transmitting/receiving a paging message in a frequency overlay communication system according to an exemplary embodiment of the present invention.

Referring to FIG. 3, if an MS 310 is not serviced for a predetermined time period and desires transition to an idle state, in step 301 the MS 310 (e.g., an NB-MS and/or an EB-MS) transmits an idle mode request message (e.g., a DeREGistration-REQuest (DREG-REQ)) to a BS 330 that is currently serving the MS 310 (e.g., an NB-BS of a frequency band of 10 MHz). The DREG-REQ message may include a period in which to receive the paging message in the idle mode, its start information, etc.

If the NB-BS 330 receives the DREG-REQ message from the MS 310 in step 301, the NB-BS 330 identifies paging information of the MS 310, and forwards the DREG-REQ message including the paging information to a Paging Entity 370 in step 303. More specifically, the NB-BS 330 may include frequency/bandwidth information of the MS 310 and an FAB number used by the MS 310 and forwards the information to the Paging Entity 370. The Paging Entity 370 manages the paging message. As illustrated in FIG. 3, the Paging Entity 370 may be provided having a separate construction from that of the other components. However, this is merely for example as the Paging Entity 370 can also be included and constructed within each BS.

Upon receiving the DREG-REQ message from the NB-BS 330, the Paging Entity 370 determines if the DREG-REQ message is suitable, and transmits an idle mode response message (DeREGistration-ReSPonse (DREG-RSP)) to the NB-BS 330 in step 305. The idle mode response message may include information regarding a paging message (e.g., forward and start time information). In step 307, the NB-BS 330 forwards the DREG-RSP message received from the Paging Entity 370 to the MS 310. At this time, if receiving the DREG-RSP message from the NB-BS 330, the MS 310 transitions to the idle state.

After the MS 310 transitions to the idle state and a predetermined time period lapses, a new service for the MS 310 may be generated. In such a case, a signal indicating the new service for the MS 310 is forwarded to the Paging Entity 370. Upon receipt of the signal indicating the new service for the MS 310, the Paging Entity 370 forwards a paging message, informing that the MS 310 has new traffic, to the managing BSs (e.g., the NB-BS 330 of an NB communication system and an EB-BS 350 of an EB communication system) in steps 309 and 311. The paging message forwarded by the Paging Entity 370 includes the FAB information on the MS 310 included at the time of forwarding the DREG-REQ message in step 303. Here, for purposes of example, it is assumed that the EB-BS 350 has a frequency band of 80 MHz.

In steps 313 and 315, each of the BSs (e.g., the NB-BS 330 and the EB-BS 350) receiving the paging message from the Paging Entity 370 determines an FAB on which to transmit a paging message to the MS 310 according to an FAB determination algorithm. An exemplary FAB determination algorithm is described below with reference to FIG. 4 and thus its description is omitted here.

In steps 317 and 319, each of the BSs (e.g., the NB-BS 330 and the EB-BS 350) of the NB communication system and EB communication system transmits the paging message received from the Paging Entity 370 only in the FAB chosen through the FAB determination algorithm.

Upon the transmission of the paging message by the BSs of the NB communication system and EB communication system in steps 317 and 319, the MS 310 receives the paging message and performs a corresponding instruction. For example, the MS 310 performs an initialization process with a corresponding BS (e.g., the EB-BS 350) through the paging message. That is, assuming a case in which the MS 310 transitions to the idle state while in the service of the NB-BS 330, and, while in the idle state, moves to a location served by the EB-BS 350, when the MS 310 receives a paging message forwarded from the changed BS (i.e., the EB-BS 350), the MS 310 determines a corresponding FA depending on an FAB information value of the NB-BS 330 and receives service in the corresponding FA.

Figure 4:
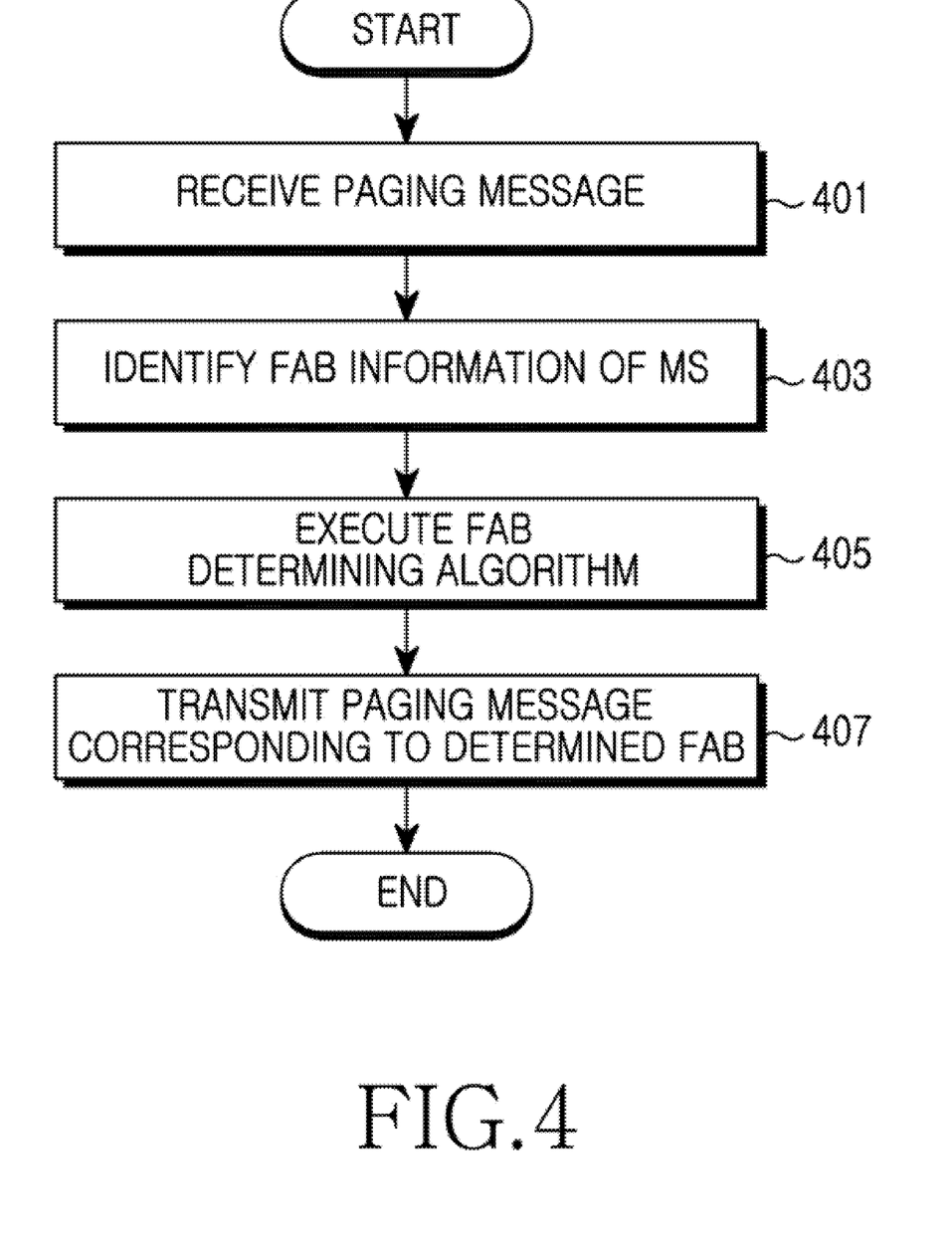
FIG. 4 is a flow diagram schematically illustrating a process of position selection for paging transmission in a frequency overlay communication system according to an exemplary embodiment of the present invention.

FIG. 4 is a flowchart schematically illustrating an FAB determining method in a frequency overlay communication system according to an exemplary embodiment of the present invention.

Referring to FIG. 4, a BS (e.g., the NB-BS 330 or EB-BS 350) determines if information is to be transmitted to an MS in step 401. In an exemplary embodiment, the BS receives a paging message from a Paging Entity indicating that information is to be transmitted to the MS. In step 403, the BS identifies information on the FAB that was last accessed by the MS that is to receive the information. In an exemplary implementation, the information of the FAB last accessed by the MS is included in the paging message received from the Paging Entity In step 405, the BS determines a sub frequency on which to transmit the information to the MS. That is, the BS determines an FAB number for the MS using the identified information, i.e., the FAB information of the MS. In an exemplary implementation of determining an FAB number for the MS, the BS performs a modulo operation using the FAB number received from the MS (e.g., 1 to 8) and the FAB number corresponding to its own system (e.g., 1, 2, or 8 for a 10 MHz, 20 MHz or 80 MHz system, respectively). For example, if the number of the FAB last accessed by the MS before an idle state is 5, the BS will receive that information in the paging message received from the Paging Entity. The BS will then perform a modulo operation using the MS' last accessed FAB number (e.g., 5) and the FAB number associated with its system. For example, if a BS operates in a system having a frequency band or FA of 80 MHz and thus an FAB number of 8 (which represents the frequency band or FA of 80 MHz divided by the minimum frequency band or FAB of 10 MHz), the BS performs a modulo operation of 5 mod 8 for a resultant FAB number of 5. Similarly, a BS operating in a system having a frequency band of 20 MHz and thus an FAB number of 2 (20 MHz divided by 10 MHz) performs a modulo operation of 5 mod 2 for a resultant FAB number of 1. Finally, a BS operating in a system having a frequency band of 10 MHz performs a modulo operation of 5 mod 1 for a resultant FAB number of 0. Here, the results of the respective modulo operations (i.e., 5, 1 and 0) indicate the number of the FAB on which to transmit the paging message to the corresponding MS. This will be explained in more detail with reference to FIG. 5 below.

The FAB count can be expressed in two ways. First, the FAB count may represent a total FAB number of the BS. Second, the FAB count may represent a number of FABs which the BS allocated to a paging group. For example, the BSs may be divided into paging groups. The BS then sends the paging information to the MS. Some FABs of a BS may be allocated for one paging group while some FABs of the BS are allocated for another paging group. The BS sends paging information to the MS in one paging group using the FAB allocated for that paging group.

In step 407, according to a paging period, the BS transmits the paging message received from the Paging Entity to a corresponding MS using an FAB corresponding to the FAB number determined in step 405. The BS then ends the exemplary process.

Figure 5A:
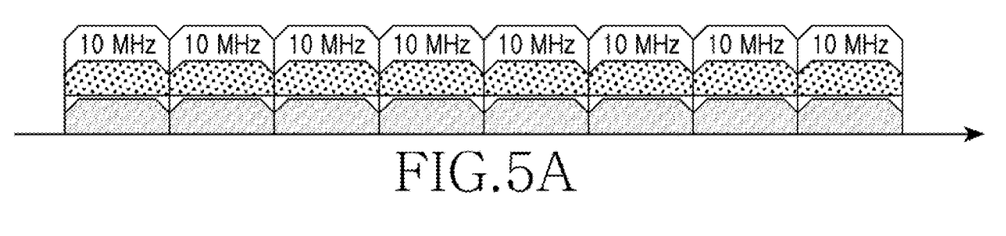
FIG. 5 is a diagram schematically illustrating a process of transmitting a paging message in a frequency overlay communication system according to an exemplary embodiment of the present invention.
Figure 5B:
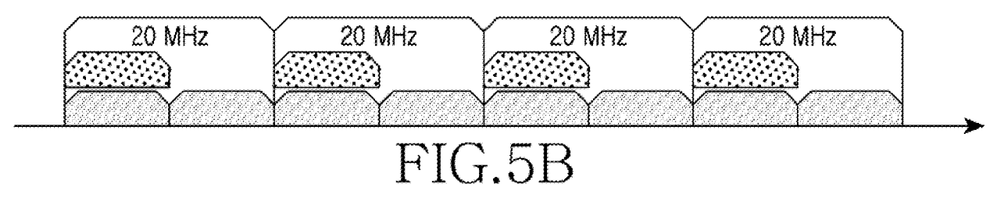
Figure 5C:
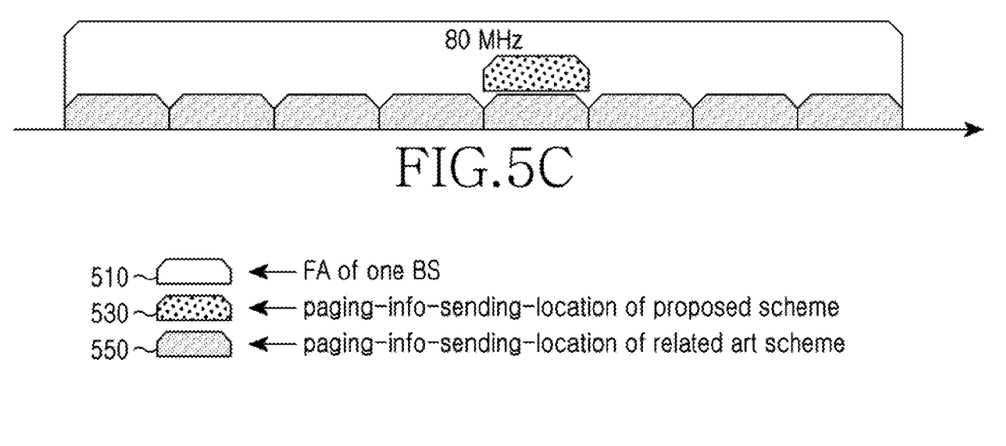

FIG. 5 is a diagram schematically illustrating a process of transmitting a paging message in a frequency overlay communication system according to an exemplary embodiment of the present invention.

Referring to FIG. 5, three examples of transmitting a paging message in a frequency overlay system are respectively provided in frames (A), (B) and (C). In each of frames (A), (B) and (C), reference numeral 510 denotes an FA of one BS, reference numeral 530 denotes a position for sending paging information according to an exemplary embodiment of the present invention, and reference numeral 550 denotes a position for sending paging information according to a related art scheme. More specifically, frame (A) illustrates a frequency overlay system including a BS having a 10 MHz FA, frame (B) illustrates a frequency overlay system including a BS having a 20 MHz FA, and frame (C) illustrates a frequency overlay system including a BS having an 80 MHz FA. In FIG. 5, for purposes of explanation, it is assumed that an MS has an FAB of 10 MHz and the FAB number last accessed by the MS before entering an idle state is 5.

In the system of frame (A), because there is only one FAB in each FA of the BS, the 10 MHz BS sends the paging information in each of the FAB bands. This is as a result of performing a modulo operation of 5 mod 1 which is equal to 0. In the system of frame (B), because the result of the modulo operation of 5 mod 2 is equal to 1, the 20 MHz BS sends the paging information in the first FAB of each FA (i.e., the number 1 FAB of the 20 MHz FA). In the system of frame (C), because a result of the modulo operation of 5 mod 8 is equal to 5, the 80 MHz BS sends the paging information only in a fifth FAB (i.e., the number 5 FAB of the 80 MHz FA). On the other hand, a related art scheme of sending paging information transmits a paging message in each FAB location 550 of each FA. It can be appreciated that, according to the illustrated exemplary embodiments, the 20 MHz BS of frame (B) can effect a paging message decrease of 50% while the 80 MHz BS of frame (C) can effect a paging message decrease of eight times compared to the related art scheme.

Figure 6:
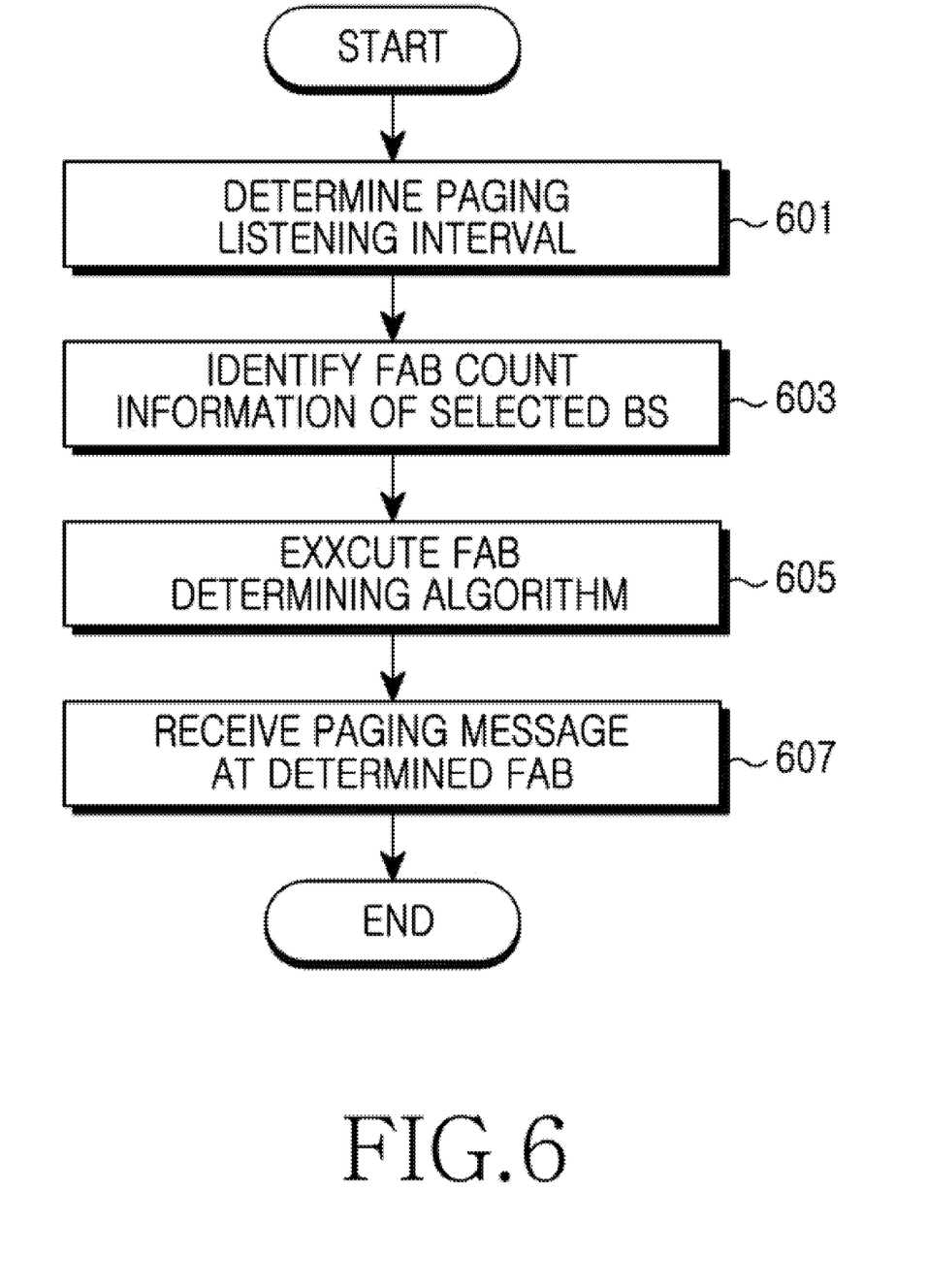
FIG. 6 is a flowchart illustrating an operation of an MS receiving paging information according to an Frequency Allocation Block (FAB) determining algorithm in a frequency overlay communication system according to an exemplary embodiment of the present invention.

FIG. 6 is a flowchart illustrating an operation of an MS for receiving paging information according to an FAB determining algorithm in a frequency overlay communication system according to an exemplary embodiment of the present invention.

Referring to FIG. 6, an MS that is in an idle state determines a paging listening interval in which to receive paging information in step 601. In step 603, the MS selects a BS to transmit the paging information, and identifies FAB count information of the selected BS. In an exemplary implementation, the FAB count information of the BS is provided through neighbor BS system information (e.g., a NeighBoR-ADVertisement (NBR-ADV) message or an overlay system information MulticarrierConfiguration-ADVertisement (MC-ADV) message) previously received by the MS. In another exemplary embodiment, the FAB count information of the BS can be provided or determined through collocated FA information which is included in the neighbor BS system information or overlay system information. For example, if a collocated FA indicator is set to 1, the count of the FA having the collocated FA indicator set to 1 is equal to the FAB count. In step 605, the MS executes a FAB determining algorithm, substantially the same as that of step 405, using the FAB count information of the BS and an FAB number last accessed by the MS before the idle state. For example, if the FAB count of the BS acquired through the neighbor BS system information (NBR-ADV) or overlay system information (MC-ADV) is equal to '4' and the FAB number last accessed by the MS is equal to '5', number 1 FAB of the BS is selected by the FAB determining algorithm based on the modulo operation of 5 mod 4. After that, in step 607, the MS receives the paging message at an FAB of the BS corresponding to the selected FAB number. In an exemplary embodiment, at the time of receiving the paging message, the MS changes its own center frequency and matches the sub frequency band corresponding to the selected FAB. After receiving the paging message, the MS ends the procedure of the exemplary embodiment. The FAB count can be expressed in two ways. First, the FAB count may represent a total FAB number of the BS. Second, the FAB count may represent a number of FABs which the BS allocated to a paging group. For example, the BSs may be divided into paging groups. The BS then sends the paging information to the MS. Some FABs of a BS may be allocated for one paging group while some FABs of the BS are allocated for another paging group. The BS sends paging information to the MS in one paging group using the FAB allocated for that paging group.

Figure 7:
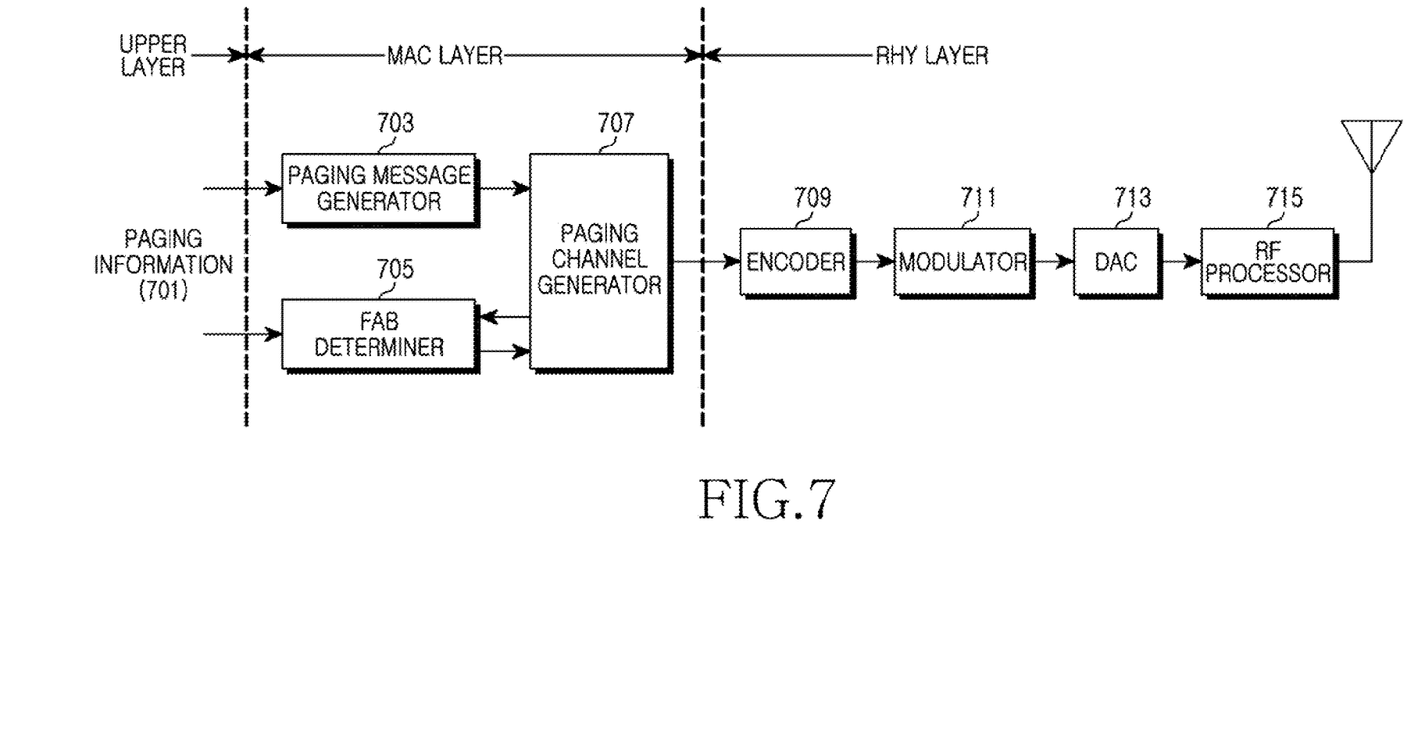
FIG. 7 is a block diagram schematically illustrating a construction of a transmitting apparatus for transmitting a paging message in a frequency overlay communication system according to an exemplary embodiment of the present invention.

FIG. 7 is a block diagram schematically illustrating a construction of an exemplary transmitting apparatus for transmitting a paging message in a frequency overlay communication system according to an exemplary embodiment of the present invention.

Referring to FIG. 7, the exemplary transmitting apparatus according to the present invention includes a paging message generator 703, an FAB determiner 705, a paging channel generator 707, an encoder 709, a modulator 711, a Digital to Analog Converter (DAC) 713, a Radio Frequency (RF) processor 715, and an antenna. If paging information 701, received from an upper layer, is forwarded, the paging message generator 703 receives and processes the paging information 701. The FAB determiner 705 determines an FAB corresponding to the paging information 701 received from the upper layer. The paging channel generator 707 generates a transmission paging message corresponding to information transmitted from the paging message generator 703 and the FAB determiner 705. The encoder 709 encodes a signal output from the paging channel generator 707. The modulator 711 modulates the signal encoded by the encoder 709. The DAC 713 converts the digital signal modulated in the modulator 711 into an analog signal. The RF processor 715 RF-processes the signal analog-converted in the DAC 713. The antenna transmits the RF-processed signal to the air.

More specifically, if the paging information 701 received from the upper layer (i.e., a Paging Entity) is forwarded to a Medium Access Control (MAC) layer, the paging message generator 703 of the MAC layer generates MS identifier information of the paging information 701 and information on paging action (e.g., position information updating, network reentry process execution, etc.), and outputs the generated information to the paging channel generator 707. At the same time, the FAB determiner 705 of the MAC layer determines an FAB to transmit the paging information 701 using information of an FAB of a corresponding MS that is a target of the paging information 701, and outputs the chosen FAB to the paging channel generator 707.

In an exemplary implementation, the FAB determiner 705 determines the FAB using the FAB determining algorithm described in FIG. 4 on the basis of the FAB information.

The paging channel generator 707 combines paging message information forwarded from the paging message generator 703 and the FAB information chosen through the FAB determiner 705, deploys a paging message in a specific FAB such that the paging message can be transmitted to the chosen corresponding FAB, and outputs the paging message to a PHYsical (PHY) layer.

Next, in the PHY layer, if data (i.e., a paging message) to be intended for transmission from the paging channel generator 707 is generated, the encoder 709 encodes the data using a preset coding scheme depending on a system situation and outputs the encoded data to the modulator 711. Here, the coding scheme may be a turbo coding scheme having a predetermined coding rate, a convolutional coding scheme, etc.

The modulator 711 receives a signal output from the encoder 709, modulates the input signal using a preset modulation scheme depending on a system channel, generates the signal into a modulation symbol, and outputs the generated modulation symbol to the DAC 713. The DAC 713 receives the digital signal from the modulator 711, converts the digital signal into an analog signal, and outputs the analog signal to the RF processor 715.

The RF processor 715 receives the analog signal from the DAC 713, loads the input signal onto a carrier frequency used in the frequency overlay communication system (e.g., the NB communication system or the EB communication system), and transmits the signal to the corresponding MS through the antenna.

Figure 8:
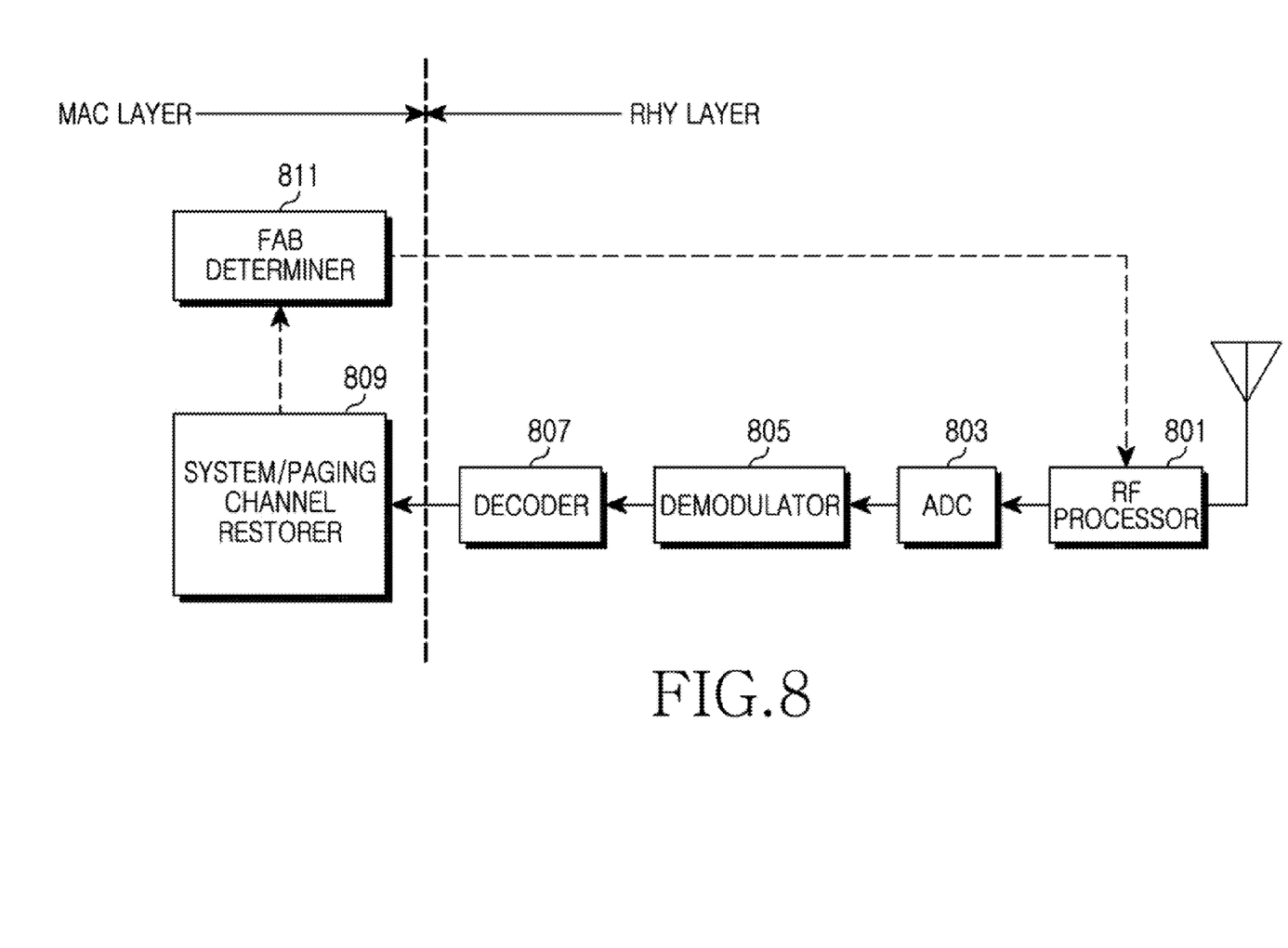
FIG. 8 is a block diagram schematically illustrating a construction of a receiving apparatus for receiving a paging message in a frequency overlay communication system according to an exemplary embodiment of the present invention.

FIG. 8 is a block diagram schematically illustrating a construction of an exemplary receiving apparatus for receiving a paging message in a frequency overlay communication system according to an exemplary embodiment of the present invention.

Referring to FIG. 8, the exemplary receiving apparatus according to the present invention includes an antenna, an RF processor 801, an Analog to Digital Converter (ADC) 803, a demodulator 805, a decoder 807, a system/paging channel restorer 809, and an FAB determiner 811. The antenna receives a signal transmitted from a transmitting apparatus. The RF processor 801 RF-processes the signal received through the antenna. The ADC 803 converts the analog signal RF-processed in the RF processor 801 into a digital signal. The demodulator 805 demodulates the signal digital-converted in the ADC 803. The decoder 807 decodes the signal demodulated in the demodulator 805. The system/paging channel restorer 809 acquires system information and paging information from the signal decoded in the decoder 807. The FAB determiner 811 determines an FAB on the basis of the information acquired by the system/paging channel restorer 809.

Before an MS that is in an idle state receives a paging message, the system/paging channel restorer 809 acquires system information on a neighbor BS, for example, an NB communication system or an EB communication system, and FAB count information on each system, and outputs the acquired information to the FAB determiner 811.

The FAB determiner 811 acquires FAB count information of a BS to currently receive a paging message through the information acquired by the system/paging channel restorer 809, and determines an FAB by which to receive the paging message. In an exemplary implementation, the FAB determiner 811 determines the FAB on the basis of the FAB determining algorithm of FIG. 4.

If a signal is received from a transmitting apparatus during a paging interval, the RF processor 801 receives a signal loaded with a carrier frequency used in a communication system being presently in use (e.g., an NB communication system or EB communication system) through the antenna, baseband-processes the signal, and outputs the baseband-processed signal to the ADC 803. Also, the RF processor 801 changes a center frequency under control of the FAB determiner 811 and chooses an FA corresponding to the control.

The ADC 803 receives an analog signal output from the RF processor 801, converts the analog signal into a digital signal, and outputs the digital signal to the demodulator 805. The demodulator 805 receives the signal output from the ADC 803, demodulates the received signal using a demodulation scheme corresponding to the modulation scheme applied in the transmitting apparatus, and outputs the demodulated signal to the decoder 807. The decoder 807 receives the demodulated signal output from the demodulator 807, decodes the signal using a decoding scheme corresponding to the encoding scheme applied in the transmitting apparatus, restores the received data, and outputs the received data to the system/paging channel restorer 809.

The system/paging channel restorer 809 restores a paging channel through the signal decoded in the decoder 807 and determines if there is a paging message forwarded to the receiving apparatus. At this time, if there is a paging message forwarded to the receiving apparatus, the system/paging channel restorer 809 performs an action instruction of the paging message (e.g., an instruction of position information updating or network reentry process execution, etc.). On the contrary, if there is no paging message forwarded to the receiving apparatus, the system/paging channel restorer 809 transitions into an idle state and repeatedly performs the above process.

As described above, an exemplary apparatus and method for transmitting/receiving a paging message in a frequency overlay communication system according to the present invention can obtain effects as follows. In a paging message transmission/reception scheme according to exemplary embodiments of the present invention, when an EB-BS has to forward a paging message of an MS, the EB-BS can forward the paging message using not all FABs but only a predefined FAB on the basis of the last accessed FAB information. Thus, a BS can save resources used to transmit a paging message, and can allocate the saved resources to a user.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a paging message by a Base Station (BS) in a frequency overlay communication system, the method comprising:

transmitting at least one of a NeighBoR-ADVertisement (NBR-ADV) message and a MulticarrierConfiguration-ADVertisement (MC-ADV) message, wherein the at least one of the NBR-ADV message and the MC-ADV message comprises frequency allocation information of the BS;

determining if information is to be transmitted to a Mobile Station (MS) that is in an idle state;

determining a sub frequency band for allocation to the MS using the frequency allocation information of the BS; and transmitting a paging message to the MS using the determined sub frequency band, wherein the determined sub frequency band comprises a Frequency Allocation Block (FAB) which is indicated by a value determined by a modulo operation using an FAB count of the BS, and wherein the FAB count of the BS comprises one of total FAB number of the BS and a number of FAB which the BS allocated to a paging group.

2. The method of claim 1, wherein the determining of the sub frequency band for allocation to the MS comprises:

determining first frequency allocation information of the MS;

determining second frequency allocation information comprising the frequency allocation information of the BS; and evaluating the first and second frequency allocation information.

3. The method of claim 2, wherein the first frequency allocation information comprises a first Frequency Allocation Block (FAB) information of the MS and the second frequency allocation information comprises a second FAB information of the BS.

4. The method of claim 3, wherein the first FAB information comprises a FAB number used by the MS prior to entering the idle state and the second FAB information comprises a number of FABs contained in a frequency allocated to the BS.

5. The method of claim 4, wherein the determining if information is to be transmitted to an MS comprises receiving a message from a paging entity, and further wherein the message received from the paging entity comprises the first FAB information.

6. The method of claim 4, wherein the evaluating of the first and second FAB information comprises performing a modulo operation consisting of first FAB information mod second FAB information.

7. A method for receiving a paging message by a Mobile Station (MS) in a frequency overlay communication system, the method comprising:
receiving at least one of a NeighBoR-ADVertisement (NBR-ADV) message and a MulticarrierConfiguration-ADVertisement (MS-ADV) message;
retrieving frequency allocation information of a Base Station (BS) from the received at least one message;
identifying a paging listening interval in which to receive a paging message in an idle state;
determining a sub frequency band on which to receive the paging message using the frequency allocation information of the BS; and
receiving the paging message on the determined sub frequency band,
wherein the determined sub frequency band comprises a Frequency Allocation Block (FAB) which is indicated by a value determined by a modulo operation using an FAB count of the BS, and wherein the FAB count of the BS comprises one of total FAB number of the BS and a number of FAB which the BS allocated to a paging group.

8. The method of claim 7, wherein the determining of the sub frequency band in which to receive the paging message comprises:
determining first frequency allocation information of the MS;
determining second frequency allocation information comprising the frequency allocation information of the BS; and
evaluating the first and second frequency allocation information.

9. The method of claim 8, wherein the first frequency allocation information comprises a first Frequency Allocation Block (FAB) information of the MS and the second frequency allocation information comprises a second FAB information of the BS.

10. The method of claim 9, wherein the first FAB information comprises a FAB number used by the MS prior to entering the idle state and the second FAB information comprises a number of FABs contained in a frequency allocated to the BS.

11. The method of claim 10, wherein the evaluating of the first and second FAB information comprises performing a modulo operation consisting of first FAB information mod second FAB information.

12. An apparatus for transmitting a paging message by a Base Station (BS) in a frequency overlay communication system, the apparatus comprising:
a transmitter for transmitting at least one of a NeighBoR-ADVertisement (NBR-ADV) message and a MulticarrierConfiguration-ADVertisement (MC-ADV) message, wherein the at least one of the NBR-ADV message and the MC-ADV message comprises frequency allocation information of the BS;
a paging message generator for determining if information is to be transmitted to a Mobile Station (MS) that is in an idle state;
a frequency determiner for determining a sub frequency band for allocation to the MS using the frequency allocation information of the BS; and
a paging channel generator for transmitting a paging message to the MS using the determined sub frequency band,
wherein the determined sub frequency band comprises a Frequency Allocation Block (FAB) which is indicated by a value determined by modulo operation using an FAB count of the BS, and wherein the FAB count of the BS comprises one of total FAB number of the BS and a number of FAB which the BS allocated to a paging group.

13. The apparatus of claim 12, wherein the frequency determiner determines the sub frequency band for allocation to the MS by determining first frequency allocation information of the MS, determining second frequency allocation information comprising the frequency allocation information of the BS, and evaluating the first and second frequency allocation information.

14. The apparatus of claim 13, wherein the frequency determiner comprises a Frequency Allocation Block (FAB) determiner, and further wherein the first frequency allocation information comprises a first FAB information of the MS and the second frequency allocation information comprises a second FAB information of the BS.

15. The apparatus of claim 14, wherein the first FAB information comprises a FAB number used by the MS prior to entering the idle state and the second FAB information comprises a number of FABs contained in a frequency allocated to the BS.

16. The apparatus of claim 15, wherein the paging message generator determines if information is to be transmitted to an MS by receiving a message from a paging entity, and further wherein the message received from the paging entity comprises the first FAB information.

17. The apparatus of claim 15, wherein the FAB determiner evaluates the first and second FAB information by performing a modulo operation consisting of first FAB information mod second FAB information.

18. An apparatus for receiving a paging message by a Mobile Station (MS) in a frequency overlay communication system, the apparatus comprising:
a receiver for receiving at least one of a NeighBoR-ADVertisement (NBR-ADV) message and a MulticarrierConfiguration-ADVertisement (MS-ADV) message comprising frequency allocation information of a Base Station (BS);
a frequency determiner for determining a sub frequency band in which to receive a paging message using the frequency allocation information of the BS; and
a paging channel restorer for identifying a paging listening interval in which to receive the paging message in an idle state and for receiving the paging message on the determined sub frequency band,
wherein the determined sub frequency band comprises a Frequency Allocation Block (FAB) which is indicated by a value determined by modulo operation using an FAB count of the BS, and wherein the FAB count of the BS comprises one of total FAB number of the BS and a number of FAB which the BS allocated to a paging group.

19. The apparatus of claim 18, wherein the frequency determiner determines the sub frequency band in which to receive the paging message by determining first frequency allocation information of the MS, determining second frequency allocation information comprising the frequency allocation information of the BS, and evaluating the first and second frequency allocation information.

20. The apparatus of claim 19, wherein the frequency determiner comprises a Frequency Allocation Block (FAB) determiner and further wherein the first frequency allocation information comprises a first FAB information of the MS and the second frequency allocation information comprises a second FAB information of the BS.

21. The apparatus of claim 20, wherein the first FAB information comprises a FAB number used by the MS prior to entering the idle state and the second FAB information comprises a number of FABs contained in a frequency allocated to the BS.

22. The apparatus of claim 21, wherein the FAB determiner evaluates the first and second FAB information by performing a modulo operation consisting of first FAB information mod second FAB information.

* * * * *